(No Model.)

G. H. STRIKER.
BALANCE STAFF GAGE.

No. 568,501. Patented Sept. 29, 1896.

WITNESSES.
Chas. F. Burkhardt
Henry L. Deck.

George H. Striker INVENTOR.
By Wilhelm Bonner
ATTORNEYS.

UNITED STATES PATENT OFFICE.

GEORGE H. STRIKER, OF BUFFALO, NEW YORK.

BALANCE-STAFF GAGE.

SPECIFICATION forming part of Letters Patent No. 568,501, dated September 29, 1896.

Application filed May 6, 1895. Serial No. 548,228. (No model.)

*To all whom it may concern:*

Be it known that I, GEORGE H. STRIKER, a citizen of the United States, residing at Buffalo, in the county of Erie and State of New York, have invented a new and useful Improvement in Balance-Staff Gages, of which the following is a specification.

This invention relates to a gage designed more especially for the use of watchmakers for obtaining the necessary measurements of the staff of a balance-wheel in repairing a broken staff or making a new one.

The objects of my invention are to provide a simple gage of this kind whereby the desired measurements can be accurately and conveniently taken and which permits the staff to be measured from time to time in truing it without the necessity of removing it from the lathe, thus insuring a truer staff than can be obtained by the use of gages which require the work to be repeatedly removed from the lathe.

Figure 1:
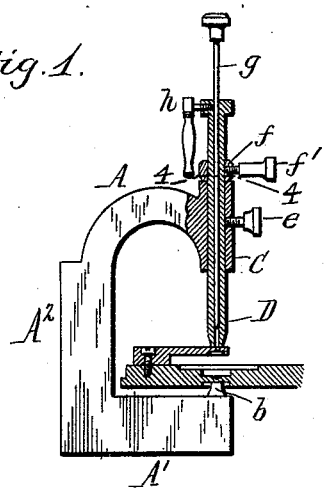
Figure 2:
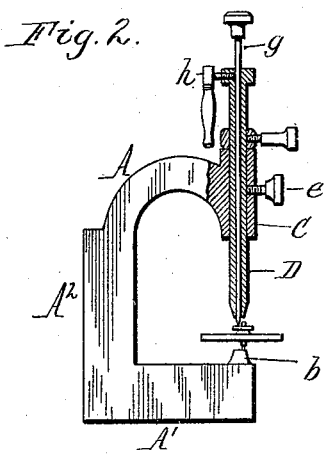
Figure 3:
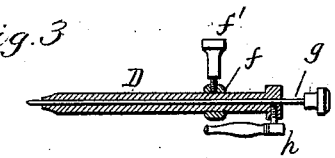
Figure 4:
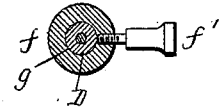
Figure 5:
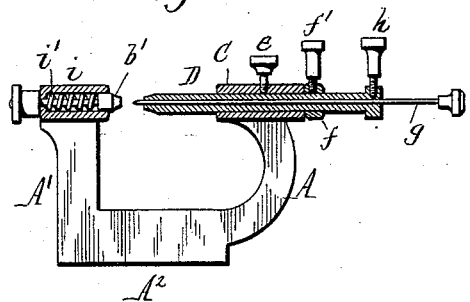
Figure 6:
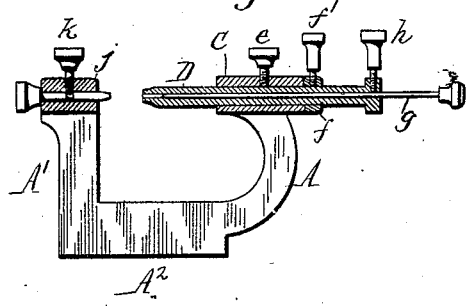

In the accompanying drawings, Figure 1 is a sectional elevation of my improved gage, showing the same adjusted to a watch-movement for ascertaining the extreme length of the balance-wheel staff. Fig. 2 is a similar view showing the device adjusted to a broken staff for ascertaining the length of the portion to be replaced. Fig. 3 is a sectional elevation of the gage-stems removed from the tool. Fig. 4 is a transverse section in line 4 4, Fig. 1, on an enlarged scale. Figs. 5 and 6 are sectional elevations of modified constructions of the gage.

Like letters of reference refer to like parts in the several figures.

The frame of the gage consists of two opposing arms or members A A', which are connected by a bar or yoke $A^2$. One of these arms is provided on its inner side near its outer end with a stud-pin or abutment $b$, against which one side of the watch-movement or one end of the balance-wheel staff is adapted to rest. The other arm of the frame is provided opposite the stud $b$ with a socket or bearing C, in which is arranged a movable gage-stem D. This gage-stem is arranged in axial alinement with the stud $b$, or substantially so, and is adjustably clamped in its bearing by a set-screw $e$, so that upon loosening this screw the gage-stem can be slid in its bearing toward and from the stud $b$.

$f$ is an adjustable stop-collar applied to the gage-stem D on the outer side of the bearing C and having a set-screw $f'$ for clamping it upon the stem. This stop-collar is adapted to abut against the outer end of the bearing, so as to limit the inward movement of the stem in the same.

$g$ is a supplemental gage-stem arranged to move lengthwise on the main gage-stem D and adapted to project with its inner or front end beyond the corresponding end of the main stem. In the construction shown in the drawings the main stem is hollow and the supplemental stem is arranged within the same. The supplemental stem is provided at its outer end with a knob for manipulating it and is clamped in position after adjustment by a set-screw $h$, which engages in a screw-threaded opening formed in an enlargement at the outer end of the main stem. It will now be understood that the main gage-stem is adjustable in the bearing of the frame and that the supplemental gage-stem is in turn adjustable in the main stem.

When my improved tool is used in repairing a staff having its upper pivot broken off, the tool or gage is placed perpendicularly in a vise or other holder, the several set-screws are loosened, and the supplemental gage-stem is retracted, so as not to project beyond the main stem, the supplemental stem being held in this position by tightening its set-screw $h$. After removing the end jewel from the balance cock or bridge the latter is firmly secured in position on the plate of the movement, and the face or dial of the movement is allowed to rest upon the stud or abutment $b$, the main gage-stem being raised sufficiently for this purpose. The main stem is next lowered until it touches the cock-hole jewel, and the stop-collar $f$ is then lowered on the main stem until it comes in contact with the upper end of the bearing C, as shown in Fig. 1, when its set-screw $f'$ is tightened. The set-screw of the main stem is then loosened, and the latter is raised to permit the removal of the movement. The cock is now again removed and the movement replaced face downward upon the stud $b$, after which the supplemental gage-stem is released and lowered through the lower-hole jewel until its lower end touches the end jewel, when it is fastened by means of its set-screw, and the main stem is then again raised to release the movement. The stop-collar is next loosened and the main stem allowed to descend until the projecting supplemental stem rests upon the stud $b$, whereupon the set-screw of the main stem is tightened, the stop-collar moved up to the bearing C and tightened, the set-screw of the supplemental stem loosened, and the latter retracted. The distance between the lower end of the main stem and the stud $b$ is the extreme or proper length of the balance-staff. All of the foregoing operations can be performed without removing the dial from the movement and without disturbing any of the parts except the cock. After determining this measurement the tool is placed in the vise horizontally. The broken balance-staff is placed with its perfect pivot against the stud $b$, and the supplemental stem is pushed forward in contact with a shoulder of the staff, such as the hair-spring seat, and fastened in place by its set-screw. The distance that the supplemental stem projects beyond the inner end of the main stem is the required length from the hair-spring seat to the end of the upper pivot of the staff. The main stem, with the supplemental stem clamped therein, may now be removed from the frame by loosening its set-screw and used as a comparative gage for measuring the length of the new pivot from time to time as it is turned in the lathe without requiring the staff to be removed from the lathe. This is an important advantage, because after once removing the work from the lathe it cannot be replaced in the same position, this being especially the case with small work, such as a balance-staff.

My improved gage thus enables the staff to be trued with the utmost accuracy and also saves the time involved in repeatedly removing and replacing the work, which is necessary with the gages heretofore employed for this purpose.

When the gage is used in building a new staff, the extreme length of the staff is determined in the manner described with reference to repairing a broken staff. To ascertain the proper height of the roller-seat, the movement is placed face down on the stud $b$, and the main gage-stem is lowered in contact with the lever-guard and fastened by its set-screw. The supplemental stem is next lowered to the lower end jewel and secured in position. The length of the projecting portion of the supplemental stem is the proper distance from the lower pivot of the staff to the roller-seat. Upon removing the gage-stems from the frame, as hereinbefore described, the staff can be accurately measured without removing the same from the lathe. The balance-seat measurement can be obtained in the same manner.

The adjustable stop-collar of the main gage-stem enables the operator to retain the extreme length measurement of the staff throughout the operations of building a new staff or repairing a broken one after such measurement has once been taken, it being only necessary to replace the main stem in the frame and slide it inward in its bearing until the stop-collar comes in contact with the bearing whenever the over-all measurement is subsequently desired.

If desired, the stud or abutment $b$, instead of being fixed, as shown in Figs. 1 and 2, may be movable, as shown in Figs. 5 and 6, so that it can be retracted for releasing the watch-movement, instead of retracting the main gage-stem for that purpose.

In the modified construction shown in Fig. 5 the stud $b'$ is arranged to slide in a socket $i$ of the frame and is held in its normal position by a spring $i'$, surrounding the stud between a shoulder of the same and the inner end of its socket. The stud is retracted against the pressure of this spring by a knob or button arranged at its outer end, as shown.

In the modification shown in Fig. 6 the stud is arranged to slide in a socket $j$ of the frame and is held in position by a set-screw $k$, which, when loosened, permits the retraction of the stud.

I claim as my invention—

The combination with the frame provided with a stud or abutment against which the watch-movement or balance-wheel staff is placed and opposite said abutment with a socket or bearing, of a removable main gage-stem capable of sliding lengthwise in said bearing, an adjustable stop mounted on said gage-stem and adapted to bear against said bearing, a supplemental gage-stem arranged to slide lengthwise in the main gage-stem, and capable of being retracted into the same, and a clamping device for adjustably securing said supplemental stem to the main stem, substantially as set forth.

Witness my hand this 3d day of May, 1895.

GEORGE H. STRIKER.

Witnesses:
FRANK J. STRIKER,
CARL F. GEYER.